(12) United States Patent
Huck et al.

(10) Patent No.: US 11,713,062 B2
(45) Date of Patent: Aug. 1, 2023

(54) REFRIGERATED BOXCAR DUCTED FLOOR

(71) Applicant: Trinity Rail Group, LLC, Dallas, TX (US)

(72) Inventors: Kenneth W. Huck, Fairview, TX (US); Carter Ray Andrews, Dallas, TX (US); Marco A. Morales, Flower Mound, TX (US); Ricky A. Cribbs, Ovilla, TX (US)

(73) Assignee: Trinity Rail Group, LLC, Dallas, TX (US)

(*) Notice: Subject to any disclaimer, the term of this patent is extended or adjusted under 35 U.S.C. 154(b) by 385 days.

(21) Appl. No.: 16/987,608

(22) Filed: Aug. 7, 2020

(65) Prior Publication Data
US 2021/0039688 A1 Feb. 11, 2021

Related U.S. Application Data

(60) Provisional application No. 62/885,025, filed on Aug. 9, 2019.

(51) Int. Cl.
*B61D 17/10* (2006.01)
*B61D 27/00* (2006.01)
*B60H 1/00* (2006.01)

(52) U.S. Cl.
CPC ......... *B61D 17/10* (2013.01); *B61D 27/0081* (2013.01); *B60H 1/00295* (2019.05)

(58) Field of Classification Search
CPC .......... B61D 3/00; B61D 17/10; B61D 27/00; B61D 27/0018; B61D 27/0027; B61D 27/0081; B61D 27/009; B60H 1/00295; B60H 2001/00221; B60H 2001/00228; B60P 3/20
See application file for complete search history.

(56) References Cited

U.S. PATENT DOCUMENTS

| | | | | |
|---|---|---|---|---|
| 2,324,749 A * | 7/1943 | Wieden | ............ | B61D 27/0081 62/328 |
| 2,565,292 A * | 8/1951 | Arthur | ................... | B61D 17/10 108/57.14 |
| 3,505,962 A * | 4/1970 | Cisco | ..................... | B61D 17/10 105/422 |

(Continued)

FOREIGN PATENT DOCUMENTS

RU 190002 U1 * 6/2019

*Primary Examiner* — Zachary L Kuhfuss
*Assistant Examiner* — Cheng Lin
(74) *Attorney, Agent, or Firm* — Baker Botts L.L.P.

(57) ABSTRACT

According to some embodiments, a refrigerated railcar comprises a pair of side walls, a roof, a floor, and a refrigeration unit. The floor comprises a bottom structure comprising a plurality of channels for return air flow from an interior of the railcar to the refrigeration unit. The floor further comprises at least two top plates coupled to the bottom structure (e.g., via a pivot rod). Each of the top plates extends longitudinally along the bottom structure and is configured to rotate up and away from the bottom structure proximate one of the side walls of the pair of side walls. Lifting an edge of a top plate opposite the edge of the top plate pivotally coupled to the bottom structure causes the top plate to rotate to an upright position exposing the plurality of channels of the bottom structure.

18 Claims, 8 Drawing Sheets

(56) References Cited

U.S. PATENT DOCUMENTS

| | | | |
|---|---|---|---|
| 7,478,600 B2 * | 1/2009 | Beers | B61D 27/0027 |
| | | | 105/423 |
| 7,743,715 B2 * | 6/2010 | Becker | B61D 17/08 |
| | | | 105/404 |
| 10,246,106 B2 * | 4/2019 | Davis | B61D 17/10 |
| 2009/0107358 A1 * | 4/2009 | Becker | B61D 17/10 |
| | | | 105/375 |

* cited by examiner

REFRIGERATED BOXCAR DUCTED FLOOR

RELATED APPLICATION

This application claims priority to U.S. Provisional Application Ser. No. 62/885,025, entitled "REFRIGERATED BOXCAR DUCTED FLOOR," filed Aug. 9, 2019.

TECHNICAL FIELD OF THE INVENTION

This disclosure relates generally to railcars, and more particularly to a ducted floor for use in a refrigerated boxcar.

BACKGROUND

Railway boxcars are often used to transport perishable cargo across large distances, via railroad lines. To prevent the cargo from spoiling, boxcars equipped with refrigeration units and insulated walls, roof, and floor are often employed, to maintain the interiors of the boxcars at desired temperatures.

SUMMARY

Railway boxcars are often used to transport perishable cargo across large distances, via railroad lines. To prevent the cargo from spoiling, boxcars equipped with refrigeration units and insulated walls, roof, and floor are often employed, to maintain the interiors of the boxcars at desired temperatures.

Additionally, the nature of the commodities transported within refrigerated boxcars generates a variety of design considerations for the floors of these boxcars. Ideally, the floors should be designed to suit a variety of different purposes. For example, the floors should support not only the weight of the commodity transported within the car, but also the weight of the equipment, such as forklifts, used to load and unload the commodity into and out of the car. The floors should also have anti-slip properties and allow for proper air flow within the boxcar when the car is loaded with commodity, to help ensure even temperature distribution within the car. Furthermore, the floors should contain minimal areas where dirt/debris, mold, and bacteria can congregate and grow, and should be designed for easy cleaning.

Existing refrigerated boxcar floors are typically only able to address a subset of these considerations. For example, to help provide for adequate airflow within the boxcars, certain designs contain closed channels through which air may be pulled from the far end of the car to a heating, ventilation, and air conditioning (HVAC) return plenum at the opposite end. Unfortunately, such channels are extremely difficult to clean because they are very difficult to access. Accordingly, dirt/debris, mold, and bacteria may accumulate in these channels. Additionally, due to the fixed nature of current designs, the air flow provided by such floors is typically fixed and cannot easily be changed to accommodate the varied air flow requirements of different commodities. For example, when fresh produce is shipped within a boxcar, aspirations generated by the produce, such as ethylene gas, should be removed from the area surrounding the commodity, to reduce ripening of the produce. Accordingly, some boxcar floors contain channels with openings to the top surface of the floor, which are used to remove such aspirations through the return air flow. However, when commodities such as frozen foods, which do not require return air flow near the product, are placed on such floors, the open channels may act merely to increase the amount of cleaning that may be needed.

This disclosure contemplates a refrigerated boxcar ducted floor that addresses one or more of the above issues. The floor consists of two parts: (1) a bottom structure that contains channels or other shapes to permit return air flow; and (2) a set of top plates configured to attach to the bottom structure using quick disconnect fasteners. These fasteners allow for easy removal and replacement of the top plates. Not only does this facilitate cleaning of the boxcar floors, it also enables the easy exchange of top plates with different designs (e.g., top plates with openings and top plates without openings), such that the specific air flow requirements of a commodity to be transported may be accommodated.

Certain embodiments of the refrigerated boxcar ducted floor may provide one or more technical advantages. For example, an embodiment may allow for customizable air flow patterns in refrigerated boxcars, to accommodate specific customer needs. As another example, an embodiment may enable easy repair and/or replacement of damaged boxcar floors. As a further example, an embodiment may facilitate cleaning of boxcar floors, helping to prevent an accumulation of dirt/debris, mold, and/or bacteria. Certain embodiments may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present disclosure, reference is now made to the following description, taken in conjunction with the accompanying drawings, in which.

DETAILED DESCRIPTION

Embodiments of the present disclosure and its advantages are best understood by referring to FIGS. 1 through 12 of the drawings, like numerals being used for like and corresponding parts of the various drawings.

Railway boxcars are often used to transport perishable cargo across large distances, via railroad lines. To prevent the cargo from spoiling, boxcars equipped with refrigeration units and insulated sidewalls are often employed, to maintain the interiors of the boxcars at desired temperatures. Additionally, the nature of the commodities transported within refrigerated boxcars generates a variety of design considerations for the floors of these boxcars. Ideally, the floors should be designed to suit a variety of different purposes. For example, the floors should support not only the weight of the commodity transported within the car, but also the weight of the forklifts used to load and unload the commodity into and out of the car. The floors should also have anti-slip properties and allow for proper air flow within the boxcar when the car is loaded with commodity, to help ensure even temperature within the car. Furthermore, the floors should contain minimal areas where dirt/debris, mold, and bacteria can congregate and grow and should be designed for easy cleaning.

Figure 1:
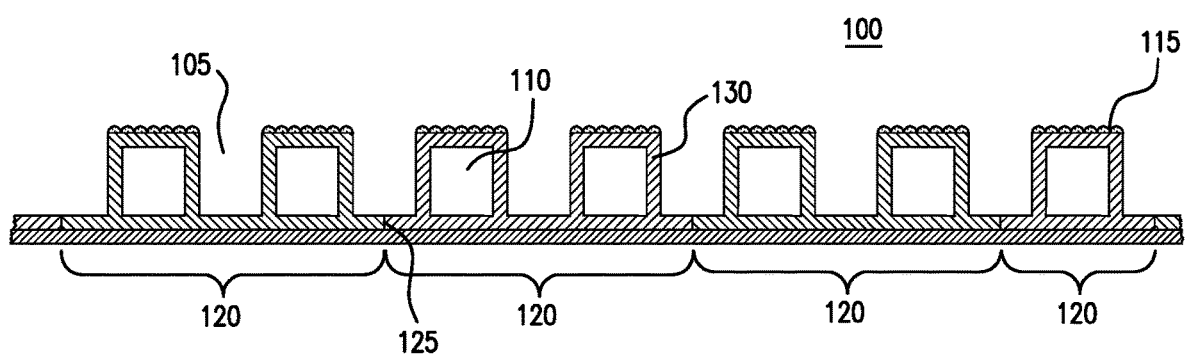
FIG. 1 illustrates an existing refrigerated boxcar floor consisting of extruded corrugated aluminum cross-sections.
Figure 2:
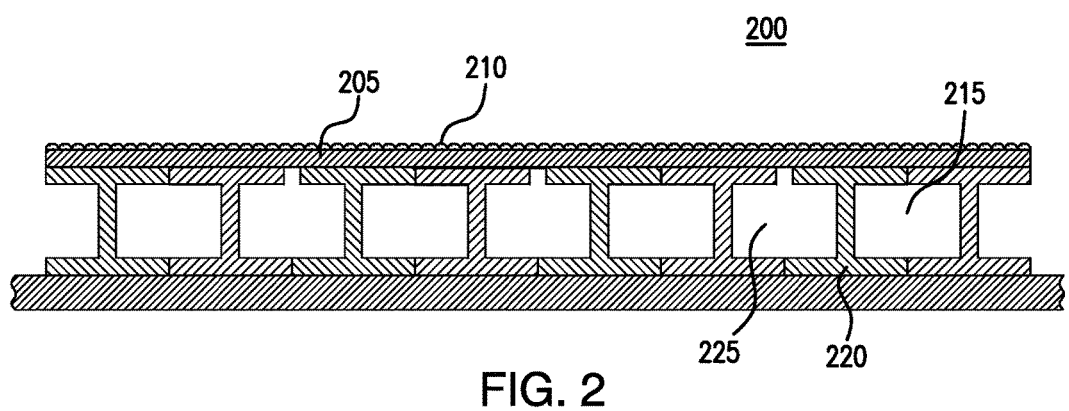
FIG. 2 illustrates an existing refrigerated boxcar floor consisting of an aluminum plate coupled to an underlying floor structure.

Existing refrigerated boxcar floors are typically only able to address a subset of these considerations. FIGS. 1 and 2 present two examples of existing refrigerated boxcar floors. FIG. 1 illustrates an example floor 100 consisting, in part, of extruded aluminum cross-sections 120 coupled to an underlying floor structure, while FIG. 2 illustrates an example floor 200 that includes an aluminum plate 205 coupled to an underlying floor structure formed from a set of I-beams 220. Commodities may be transported on the top surfaces of such floors (either directly on the top surfaces or on pallets placed on top of the top surfaces). The top surfaces may transfer and distribute the commodity loads as well as the forklift loads (arising when forklifts are used to load/unload commodity from the boxcar) into the underlying floor structure. The underlying floor structure may then transfer the commodity and forklift loads into the railcar structure. To help provide traction within the boxcar, the top surfaces of floor 100 and floor 200 typically include anti-slip features. For example, floor 100 typically includes anti-slip features 115 as part of the extrusions, while floor 200 typically includes anti-slip features as part of plate 205.

In order to provide for air flow within the refrigerated boxcar, floors 100 and 200 typically contain channels allowing air to flow through the floor and to return to an HVAC return plenum located at an end of the boxcar. For example, FIG. 1 illustrates closed channels 110 and open channels 105, formed from extrusions 120, while FIG. 2 illustrates closed channels 215 and open channels 225 formed between adjacent I-beams in the underlying floor structure of floor 200. While FIGS. 1 and 2 illustrate floors 100 and 200 that include both open channels and closed channels, certain extrusion-type floors 100 may contain only open channels 105 (with regions 110 filled with material) and certain floors 200 may contain only open channels 225 or only closed channels 215. Open channels 105 and 225 may be desirable to remove aspersions from the commodity, such as ethylene gas, generated by fresh produce that is shipped within a boxcar, thereby helping to reduce ripening of the produce during transport. On the other hand, channels 110 and 215, which may be closed along the length of the boxcar, may be desirable to enable the HVAC unit to pull air from the far end of the boxcar, to help provide adequate air flow within the car.

Despite the above described benefits, the designs of floors 100 and 200 typically lead to several issues. For example, while providing for some air flow within the boxcar, this air flow is typically fixed due to the nature of the designs of floors 100 and 200. Accordingly, the air flow within the boxcar may not easily be changed to accommodate different commodities transported within the boxcar. For example, consider an extrusion-type floor 100 containing only open channels 105. When there is little commodity within the boxcar, or the commodity is placed on pallets, such that a substantial amount of open-air flow is permitted in open channels 105, most of the return air flowing into the HVAC unit will come from the area of the boxcar closest to the return air plenum. This may result in limited air flow at the far end of the boxcar, resulting in an uneven temperature distribution within the car. On the other hand, if the extrusions 120 contain closed channels 110, or if channels are provided for elsewhere within floor 100, return air may be pulled from the far end of the boxcar for better air flow within the car; however, the closed nature of channels 110 may make them difficult to clean, potentially leading to an accumulation of dirt/debris, mold, and/or bacteria in channels 110.

In addition, the extrusion-type design of floor 100 brings with it a number of other issues. For example, when certain commodities are placed directly on top of floor 100, such as frozen foods, which do not require return air flow near the commodity, open channels 105 may merely serve to increase cleaning efforts. As another example, extrusions 120 may be of limited width due to the tooling used to create them. Accordingly, the width and length of floor 100 may be made up of multiple sections of extrusions joined together. If the resulting seams and joints 125 are not properly sealed, they may provide additional areas where mold and mildew may accumulate in floor 100. This may make further increase the time and/or effort needed to properly clean floor 100. As another example, extrusions 120, which are frequently a permanent part of floor 100, may become damaged (or anti-slip features 115 may wear out), potentially requiring replacement of extrusions 120, which may be a difficult and/or expensive process. As a final example, the use of extrusions 120 may hinder loading of commodities into and out of the boxcars in which floors 100 are installed. This is because extrusions 120 may damage forklift tires if the forklift travels on floor 100 in a direction that is not parallel to extrusions 120.

Similar to floor 100, the design of floor 200 also leads to a number of issues. For example, top plates 205 typically contain multiple seams and joints, which may be difficult to clean. Additionally, top plates 205 are typically secured to I-beams 220 using rivets, screws, and/or bolts, which may make it difficult to remove top plates 205 from I-beams 220 for cleaning and/or replacement. Furthermore, such mechanical fasteners may be subject to wear over time, as a result of the forklifts, commodity pallets, and/or slip sheets placed and/or traveling on top of floor 200. When these fasteners wear down, their holding ability may be reduced, which may lead to top plates 205 curling or lifting up, or otherwise moving.

This disclosure contemplates a refrigerated boxcar ducted floor that addresses one or more of the above issues. The floor consists of two parts: (1) a bottom structure that contains channels or other shapes to provide for return air flow; and (2) a set of top plates configured to attach to the bottom structure using quick disconnect fasteners. These fasteners allow for easy removal and replacement of the top plates. Not only does this facilitate cleaning of the boxcar floors, it also enables the easy exchange of top plates of different designs (e.g., top plates with openings and top plates without openings), such that the specific air flow requirements of a commodity to be transported may be accommodated. The refrigerated boxcar ducted floor will be described in further detail using FIGS. 3 through 12.

Figure 3:
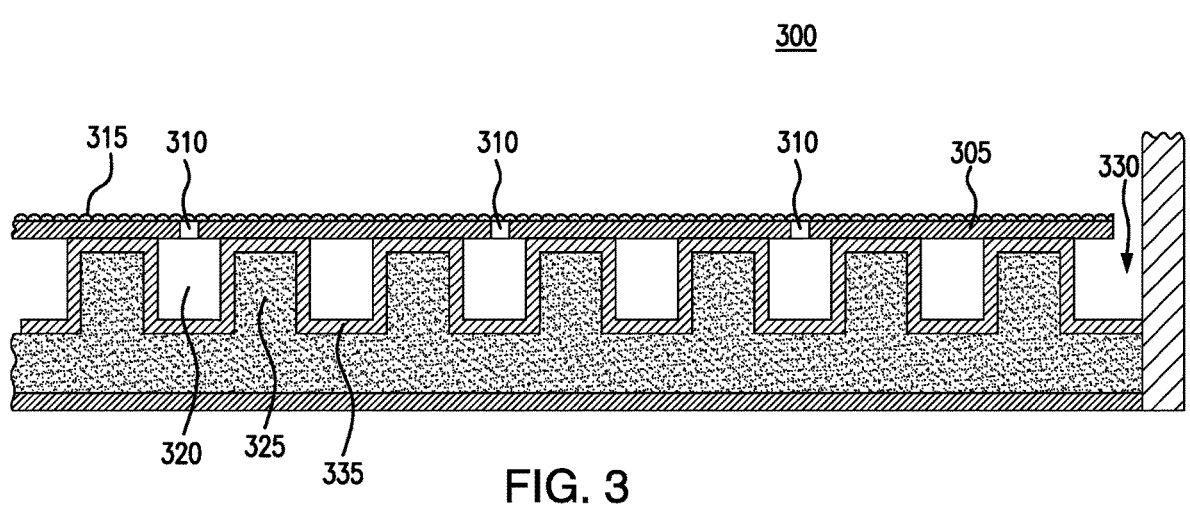
FIG. 3 illustrates a cross-section of the refrigerated boxcar ducted floor of the present disclosure.

FIG. 3 illustrates the refrigerated boxcar ducted floor 300 of the present disclosure. As illustrated in FIG. 3, floor 300 includes a bottom structure 335 and a top plate 305. This disclosure contemplates that top plate 305 is designed to transmit and distribute both commodity and forklift loads into bottom structure 335, while bottom structure 335 is designed to transfer such loads into the underlying railcar structure. This disclosure contemplates that top plate 305 and bottom structure 335 may be formed from metal or any other suitable material. Furthermore, this disclosure contemplates that top plate 305 and bottom structure 335 may be formed from the same or different materials.

In certain embodiments (and as illustrated in FIG. 3), bottom structure 335 may include one or more corrugated pieces of material, where the material has been folded or shaped to create a series of rectangular-shaped channels/ducts 320, spaced between a set of rectangular-shaped protrusions 325. In certain embodiments, channels/ducts 320 may be of a uniform size throughout floor 300, while in certain other embodiments, channels/ducts 320 may be of different sizes. Similarly, in certain embodiments, protrusions 325 may be of a uniform size throughout floor 300, while in certain other embodiments, protrusions 325 may be of different sizes. Channels/ducts 320 may help to facilitate return air flow within floor 300, while protrusions 325 may help support top plate 305. In certain embodiments, protrusions 325 may be filled with material such as foam, or any other suitable insulating material, to help reduce heat transfer through refrigerated boxcar floor 300. In some embodiments, protrusions 325 may be left empty.

While FIG. 3 illustrates the use of a corrugated bottom structure 335, this disclosure contemplates that bottom structure 335 may include any suitable support structure of a suitable strength to support top plate 305 and designed with an area below top plate 305 suitable for return air flow. For example, in certain embodiments, bottom structure 335 may include a series of rectangular-shaped tubes, which run the length of the boxcar. Such tubes may be formed from metal or any other suitable material. For example, in certain embodiments, the tubes may be formed from polymers. This disclosure contemplates that such tubes may be spaced apart from one another to provide an area beneath top plate 305 for return air flow to an HVAC system installed in the boxcar. In certain embodiments, the tubes may be evenly spaced from one another, while in other embodiments, the tubes may be non-uniformly spaced.

As illustrated in FIG. 3, top plates 305 may be coated or formed with an anti-slip material 315 to provide traction to top plate 305. Additionally, in certain embodiments, top plates 305 may contain openings 310, leading to channels/ducts 320, to help remove aspersions generated when transporting fresh produce. The use of openings 310 will be described in further detail below, in the discussion of FIG. 4.

This disclosure contemplates that top plates 305 may be of any suitable size or thickness. For example, in certain embodiments top plates 305 may be of a size such that a pair of top plates 305 may approximately span the width of the boxcar in which floor 300 is installed. In certain embodiments, the thickness of top plates 305 may be such that the combined height of top plates and bottom structure 335 is approximately the same as a traditional boxcar floor. This may be desirable when loading/unloading the boxcar, to help ensure compatibility with existing loading dock heights. Additional size considerations for top plates 305 will be described below, in the discussion of FIGS. 6 through 9.

This disclosure contemplates that top plates 305 may be fixedly attached to bottom structure 335. This may be desirable, due to the shear loads that top plates 305 tend to experience. For example, when the boxcar in which floor 300 is installed is subject to longitudinal impacts and vibrations and/or lateral vibrations, the inertia of both top plates 305 and the commodity transported on top of top plates 305 tends to create a shear between top plates 305 and bottom, ducted structure 335. Additionally, fixedly attaching top plates 305 to bottom structure 335 may be desirable to help prevent movement of top plates 305 during vertical accelerations of the boxcar. This disclosure contemplates that top plates 305 may be attached to bottom structure 335 in any suitable manner. For example, in certain embodiments, top plates 305 may be attached to bottom structure 335 using mechanical fasteners, adhesive, or any combination of mechanical fasteners and adhesive.

In certain embodiments, top plates 305 may be attached to bottom structure 335 using quick disconnect, quarter-turn fasteners. The use of quick disconnect, quarter-turn fasteners may be desirable, because such fasteners may provide top plates 305 with both vertical restraint and lateral shear resistance, while facilitating easy removal of top plates 305 for cleaning and/or replacement. The use of quick disconnect, quarter-turn fasteners will be described in greater detail below, in the discussion of FIGS. 10 and 11. The ability to easily remove top plates 305 may be especially desirable, as it allows for customization of floor 300, to suit the particular air flow needs of different commodities to be transported within the boxcar in which floor 300 is installed. Example ways in which top plates 305 may be customized will be described in greater detail below, in the discussion of FIGS. 4 through 11.

Figure 4:
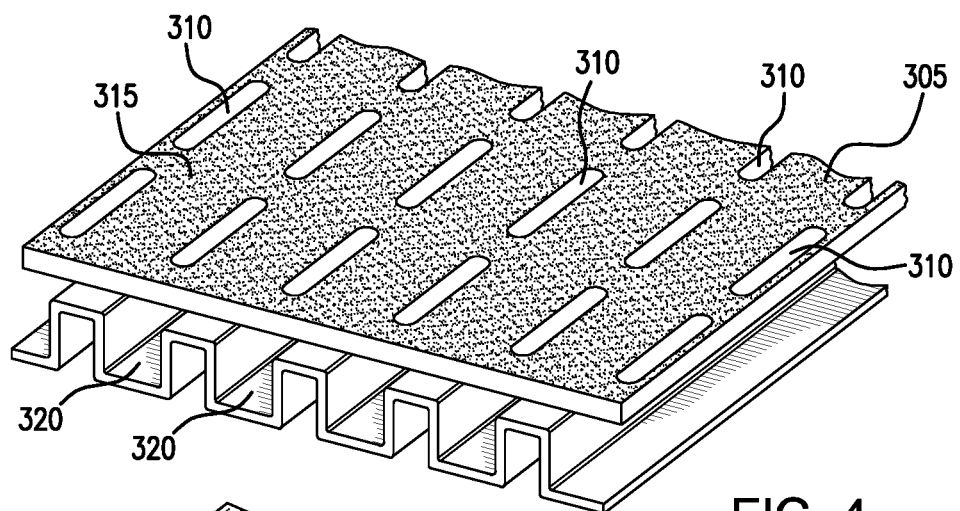
FIG. 4 illustrates an example top plate of the refrigerated boxcar ducted floor of FIG. 3, containing a set of openings.
Figure 5:
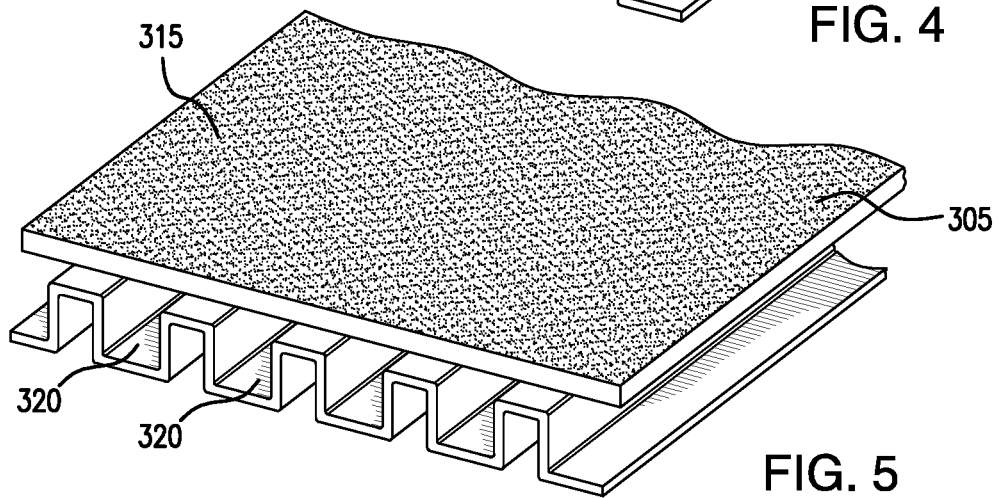
FIG. 5 illustrates an example top plate of the refrigerated boxcar ducted floor of FIG. 3 that does not contain any openings.

FIGS. 4 and 5 illustrate two different top plates 305 either of which may be chosen for a refrigerated boxcar floor, depending on the commodity to be transported within the boxcar. FIG. 4 illustrates a top plate 305 that includes a set of openings 310. Such a top plate may be desirable for use when transporting fresh produce. In contrast, FIG. 5 illustrates a top plate 305 without any openings. Such a top plate may be desirable for use when transporting frozen commodities.

As illustrated in FIG. 4, openings 310 in top plates 305 lead to channels/ducts 320 in bottom structure 335. The use of openings 310 may help to remove aspersions, such as ethylene gas, generated by fresh produce that is shipped within the boxcar, from the area surrounding the commodity, thereby helping to reduce the aspersions and accordingly reduce ripening of the produce during transport. This disclosure contemplates that openings 310 may be of any shape and/or size. For example, in certain embodiments, openings 310 may be circular holes, elongated slots, or any other suitable shape. In certain embodiments, openings 310 may be uniform in shape. In certain other embodiments, openings 310 may include a variety of different shapes. Additionally, this disclosure contemplates that openings 310 may be arranged in any pattern or orientation on top plates 305. The disclosure contemplates that the sizes, shapes, patterns, and/or orientations of openings 310 may be chosen to optimize air flow within the boxcar and to balance the amount of air flow across the length and the width of the boxcar.

In contrast, when a consumer desires to ship commodities such as frozen foods, which do not require return air flow in the immediate vicinity of the commodity, top plate 305 of FIG. 4, may easily be replaced with top plate 305 of FIG. 5, which does not contain any openings 310. For example, quick disconnect, quarter-turn fasteners used to attach top plate 305 of FIG. 4 to bottom structure 335 may be released, top plate 305 of FIG. 4 may be removed from bottom structure 335, and top plate 305 of FIG. 5 may be installed in its place. The use of top plate 305 of FIG. 5 may be desirable to minimize dirt and debris accumulation and facilitate easy cleaning of top plate 305.

In some embodiments, top plate 305 may comprise openings 310 that are positioned such that in a first configuration openings 310 are positioned above channels/ducts 320 to facilitate return air flow through floor 300. In a second configuration, openings 310 are positioned above protrusions 325 to restrict return air flow through floor 300. For example, removing top plate 305, rotating it 180 degrees, and reinstalling top plate 305 may convert top plate 305 from one that facilitates return air flow to one that prevents return air flow. Accordingly, a particular advantage is that one top plate (instead of two different top plates) may provide both features.

Figure 6:
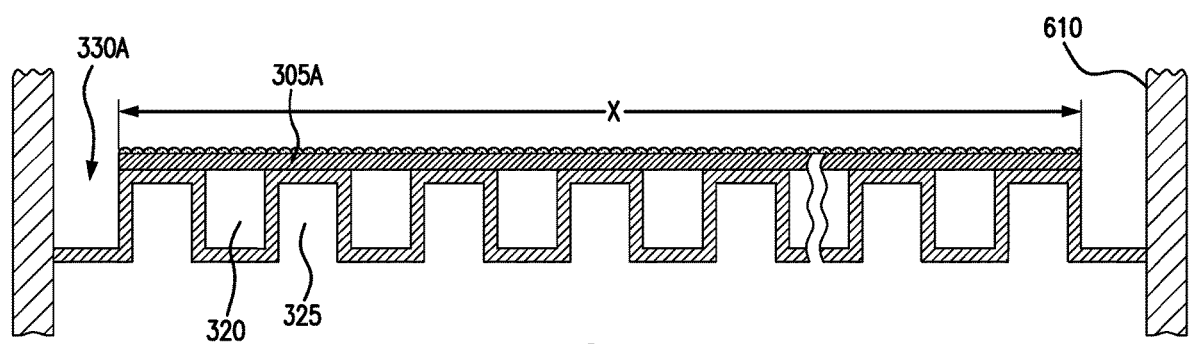
FIGS. 6 and 7 illustrate the use of different sized top plates in the refrigerated boxcar ducted floor of FIG. 3, to control the amount of return air flow from gutters running longitudinally along the length of the railcar.
Figure 7:
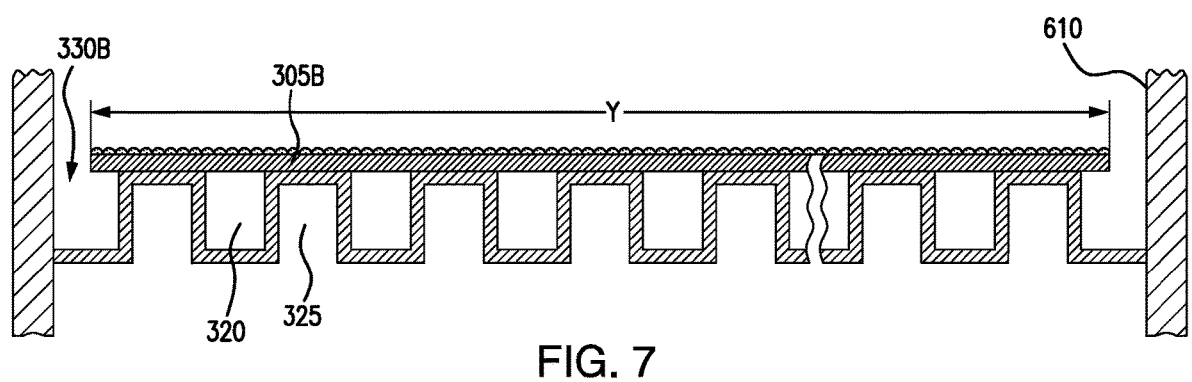
Figure 8:
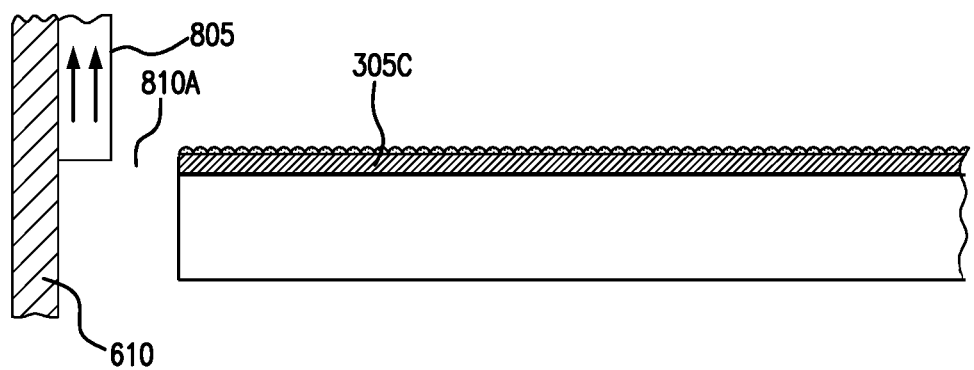
FIGS. 8 and 9 illustrate the use of different sized top plates in the refrigerated boxcar ducted floor of FIG. 3, to control the amount of return air flow to the HVAC plenum.
Figure 9:
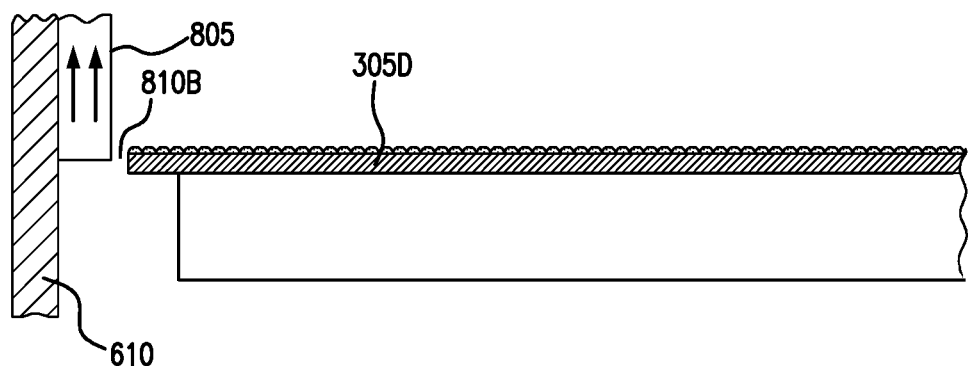

FIGS. 6 through 9 illustrate the use of different sized top plates to control the amount of return air flow in the refrigerated boxcar in which floor 300 is installed. FIGS. 6 and 7 illustrate the use of different sized top plates in the lateral direction of the refrigerated boxcar, while FIGS. 8 and 9 illustrate the use of different sized top plates in the longitudinal direction of the refrigerated boxcar.

In order to obtain proper air flow within the refrigerated boxcar (when the commodity that is being transported within the boxcar is placed either directly on top of top plates 305 or set slightly above top plates 305) the return air flow within the boxcar should be balanced. To prevent excessive back flow in the return air plenum, located at an end of the boxcar, some of the return air should come from channels/ducts 320 under top plate 305, some of the return air should come from the space 810 between the return air duct 805 and the floor, at the end of the boxcar where the HVAC unit is located, and some of the return air should come from gutters 330, located on either side of floor 300, between floor 300 and inner sidewalls 610, and running longitudinally down the length of the boxcar.

The return air flow from gutters 330 may be controlled by adjusting the lateral size of plates 305, such that they may or may not extend over a portion of gutters 330. For example, FIG. 6 illustrates an embodiment in which the lateral length, X, spanned by top plates 305A is such that top plates 305A do not cover any portion of gutter 330A. The use of such top plates 305A may be desirable to regulate the amount of return air flow from gutters 330A. In this example, more airflow from the gutter into the HVAC return would be from the area closer to the HVAC return air duct. On the other hand, FIG. 7 illustrates an embodiment in which the lateral length, Y, spanned by top plates 305B, is such that top plates 305B extend into gutter 330B. The use of such top plates 305B may be desirable to regulate the amount of return air flow from gutters 330B. This may allow for more return air to come from openings 310 in top plates 305B and/or from channels/ducts 320 below top plates 305B and return air in the gutters from farther away from the HVAC return air duct than that described above, in the discussion of FIG. 6.

The return air flow from space 810 between the return air duct 805 and floor 300, at the end of the boxcar where the HVAC unit is located, may similarly be controlled by adjusting the longitudinal size of plates 305, such that they may or may not extend over a portion of space 810, between return air duct 805 and floor 300. For example, FIG. 8 illustrates an embodiment in which the longitudinal length spanned by top plates 305C is such that top plates 305C do not cover any portion of space 810. The use of such top plates 305C may be desirable to increase the amount of return air flow from space 810A. In contrast, FIG. 9 illustrates an embodiment in which the longitudinal length spanned by top plates 305D is such that top plates 305D extend into space 810. The use of top plates 305D may be desirable to reduce the amount of return air flow from space 810B. When top plate 305 contains openings 310 (e.g., when transporting fresh produce within the boxcar), the return air space between return air duct 805 and floor 300, at the end of the boxcar in which the HVAC system is located, may be minimized, as illustrated in FIG. 9. Reducing the amount of return air flow from gutters 330 and/or space 810 may be desirable to allow more return air flow to come from openings 310 and/or channels/ducts 320, to provide for adequate air flow at the far end of the boxcar and/or across the width of the boxcar. On the other hand, when top plate 305 does not contain openings 310 (e.g., when transporting frozen commodities), the amount of return air flow from gutters 330 and/or space 810 may be increased by using top plates 305 configured to span shorter longitudinal and/or lateral dimensions.

Figure 10:
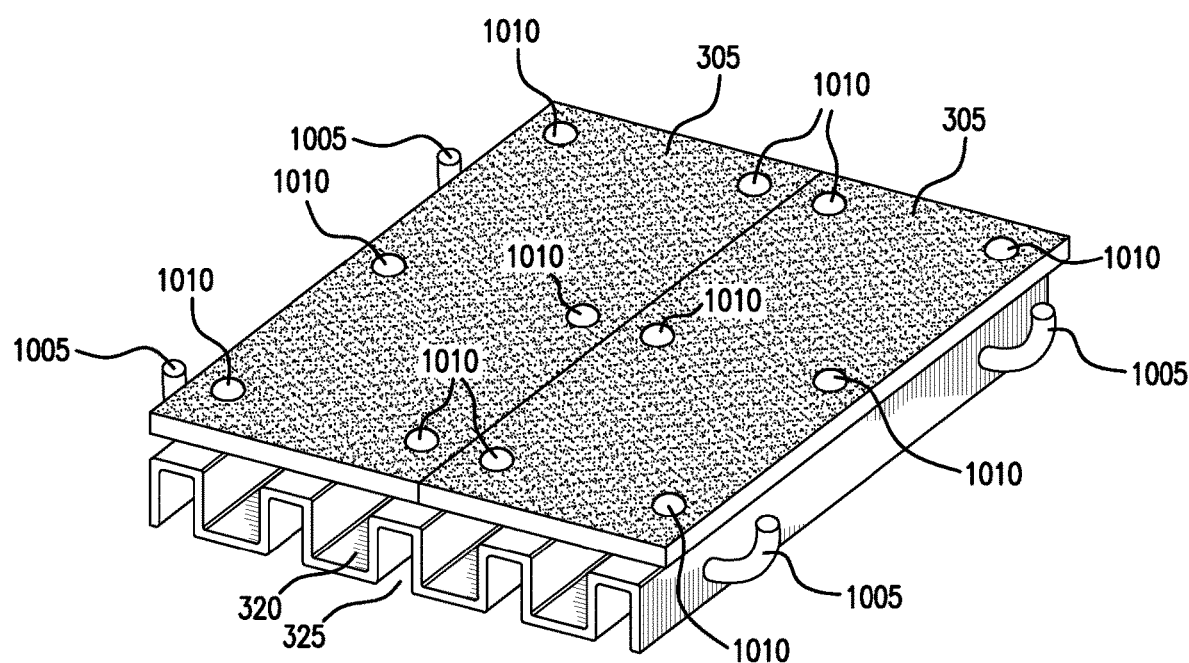
FIG. 10 illustrates the use of quick disconnect fasteners to attach the top plates to the corrugated bottom section of the refrigerated boxcar ducted floor of FIG. 3.
Figure 11:
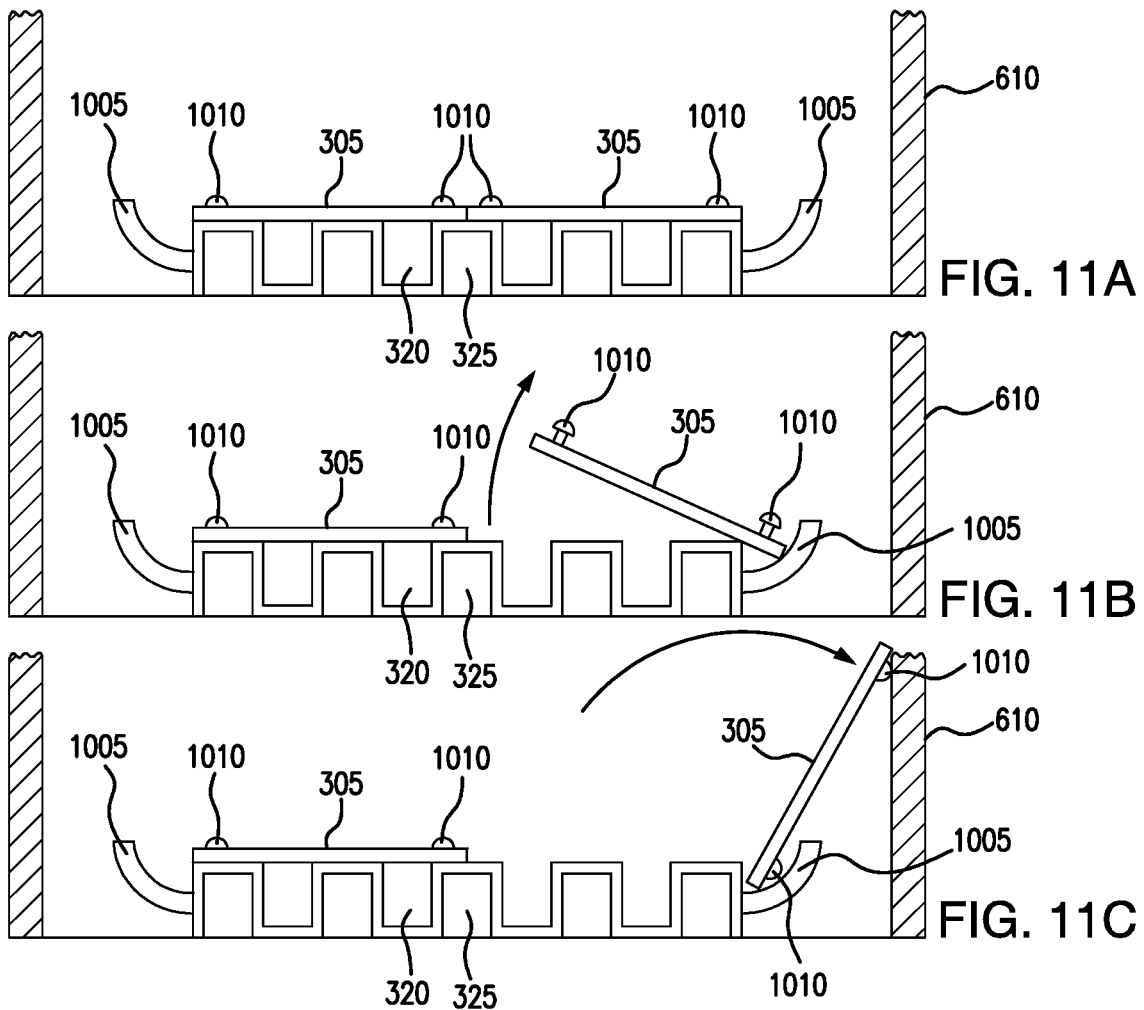
FIGS. 11A through 11C illustrate the process by which a top plate may be rotated away from the corrugated bottom section of the refrigerated boxcar ducted floor of FIG. 3.
Figure 12:
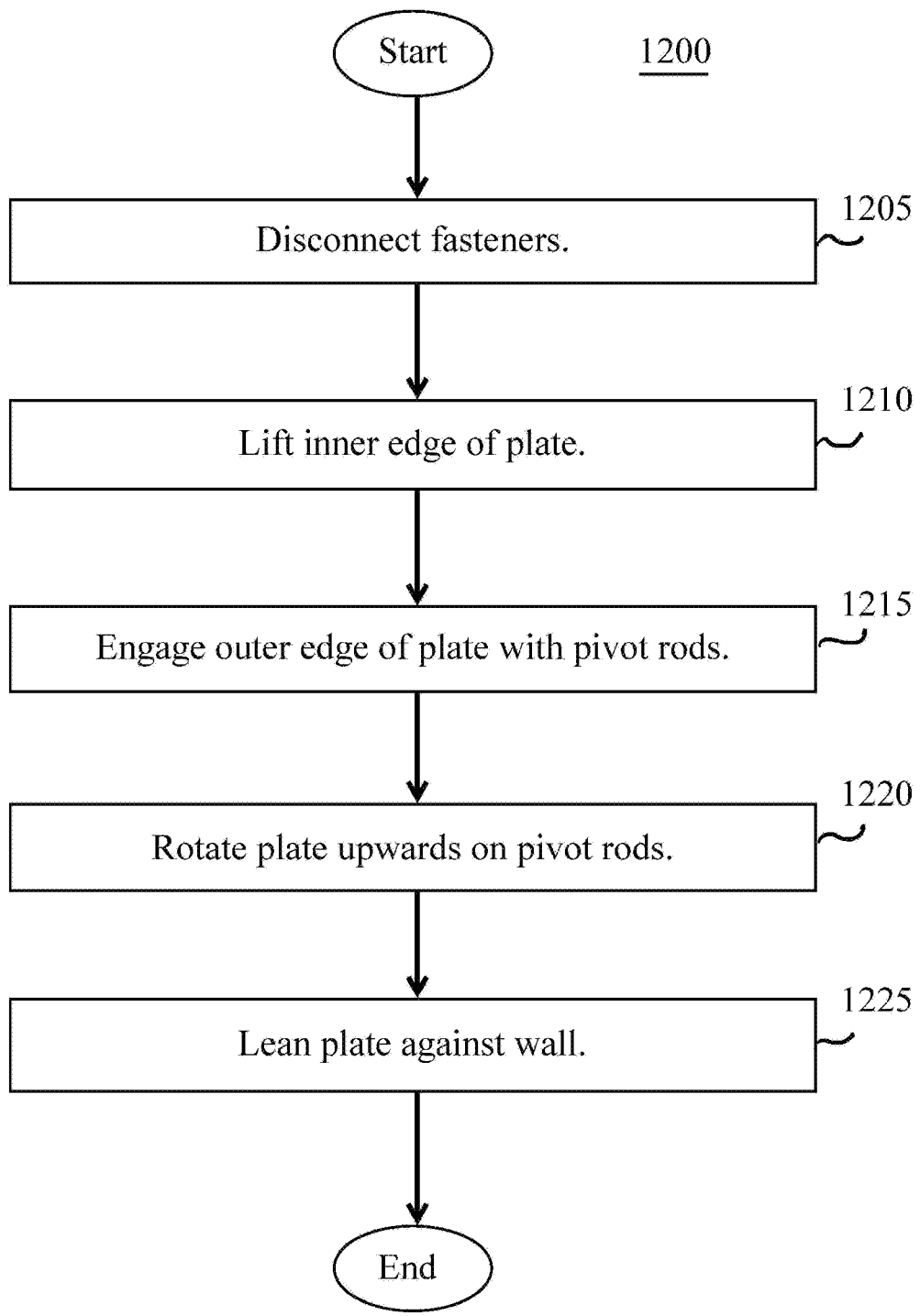
FIG. 12 presents a flowchart describing the process by which a top plate may be rotated away from the corrugated bottom section of the refrigerated boxcar ducted floor of FIG. 3.

As described above, the ability to customize top plates 305 according to particular air flow needs may be facilitated through the use of quick disconnect, quarter-turn fasteners. FIGS. 10 through 12 illustrate the use of such fasteners.

FIG. 10 illustrates a pair of top plates 305 attached to bottom structure 335 using quick disconnect, quarter-turn fasteners 1010. Such fasteners may be positioned above protrusions 325 and extend into (or through) protrusions 325, to engage bottom structure 335. This disclosure contemplates that any number of quick disconnect, quarter-turn fasteners 1010 may be used to fasten top plate 305 to bottom structure 335. Additionally, as described above, in the discussion of FIG. 3, this disclosure contemplates that in addition to the use of quick disconnect, quarter-turn fasteners 1010, any type of fastener and/or adhesive may be used to attach top plate 305 to bottom structure 335. The use of quick disconnect, quarter-turn fasteners 1010 may be desirable to facilitate removal and/or replacement of top plates 305. Additionally, the use of quick disconnect, quarter-turn fasteners may facilitate easy cleaning of floor 300. For example, by disconnecting top plate 305 from bottom structure 335, an employee may be able to clean not only the top surface of top plate 305, but also the underside of top plate 305, channels/ducts 320, and gutters 330.

As illustrated in FIGS. 10 and 11, certain embodiments of floor 300 may contain pivot rods 1005, which may be used to further facilitate cleaning of floor 300. Pivot rods 1005 may be coupled to bottom structure 335 along each longitudinal side of bottom structure 335 and extend into gutters 330. This disclosure contemplates that any number of pivot rods 1005 may be coupled to bottom structure 335.

As illustrated in FIGS. 11A through 11C, pivot rods 1005 may allow for top plates 305 to be disconnected from bottom structure 335 and rotated up and away from bottom structure 335. In such embodiments, the sizes of top plates 305 may be such that two top plates 305 span the lateral width of floor 300.

As an example of operation, once quick disconnect, quarter-turn fasteners 1010 have been turned, thereby disconnecting top plate 305 from bottom structure 335, the outer longitudinal edge of top plate 305 may be positioned against pivot rods 1005, to engage top plate 305 with pivot rods 1005. The inner edge of top plate 305, located approximately along the longitudinal centerline of floor 300 may then be lifted, causing top plate 305 to rotate about pivot rods 1005, up and away from bottom structure 335, as illustrated in FIG. 11B. Top plate 305 may then be rotated until it is able to rest against inner boxcar wall 610. In this manner, bottom structure 335, including channels/ducts 320 and protrusions 325, may be exposed, allowing for easy cleaning. Additionally, the curved shape of pivot rods 1005 may help to prevent debris buildup on pivot rods 1005 and may help resist water and/or other commodities from becoming trapped on them. Once bottom structure 335 has been cleaned, top plate 305 may then be rotated back onto bottom structure 335, quick disconnect, quarter-turn fasteners 1010 may be re-engaged, and gutters 330 and pivot rods 1005 may then easily be cleaned.

This disclosure contemplates that in addition to pivot rods 1005, any mechanism may be used to rotate top plates 305 up and away from bottom structure 335. For example, in certain embodiments, top plates 305 may be connected to bottom structure 335 using hinges located along the outer longitudinal edges of top plates 305.

FIG. 12 presents a flowchart further describing the process by which a top plate 305 may be rotated up and away from bottom section 335, to facilitate cleaning of bottom section 335. In step 1205, an employee may disconnect fasteners 1010, thereby disconnecting top plate 305 from bottom structure 335. In step 1210, the employee may lift the inner longitudinal edge of top plate 305. In step 1215, the employee may position the outer edge of top plate 305 in pivot rod 1005, thereby engaging top plate 305 with pivot rod 1005. In step 1220, the employee may continue to lift the inner edge of top plate 305, thereby causing top plate 305 to rotate about pivot rod 1005, up and away from bottom structure 335. Finally, in step 1225, the employee may lean top plate 305 against inner boxcar wall 610.

Modifications, additions, or omissions may be made to method 1200 depicted in FIG. 12. Method 1200 may include more, fewer, or other steps. For example, steps may be performed in parallel or in any suitable order. While discussed as an employee performing the steps, this disclosure contemplates that the steps may be performed by a machine or any other device.

Although the present disclosure includes several embodiments, a myriad of changes, variations, alterations, transformations, and modifications may be suggested to one skilled in the art, and it is intended that the present disclosure encompass such changes, variations, alterations, transformations, and modifications as falling within the scope of this disclosure.

The invention claimed is:

1. A refrigerated railcar comprising a pair of side walls, a roof, a floor, and a refrigeration unit, the floor comprising:
a bottom structure comprising a plurality of channels for return air flow from an interior of the railcar to the refrigeration unit; and
at least two top plates coupled to the bottom structure, wherein each of the top plates extends longitudinally along the bottom structure and is configured to rotate up and away from the bottom structure proximate one of the side walls of the pair of side walls;
wherein the at least two top plates are pivotally coupled to the bottom structure via one or more pivot rods coupled to a longitudinal edge of the bottom structure proximate one of the side walls of the pair of side walls, wherein lifting an edge of a top plate opposite the edge of the top plate pivotally coupled to the bottom structure causes the top plate to rotate to an upright position exposing the plurality of channels of the bottom structure.

2. The railcar of claim 1, wherein the at least two top plates are coupled to the bottom structure via one or more mechanical quick disconnect fasteners.

3. The railcar of claim 1, wherein the at least two top plates comprise openings that permit return air to flow through the top plates into the plurality of channels of the bottom structure.

4. The railcar of claim 1, wherein the at least two top plates prevent return air from flowing through the top plates into the plurality of channels of the bottom structure.

5. The railcar of claim 1, wherein the at least two top plates comprise openings that, when oriented in a first position the openings are above the plurality of channels for return air flow and permit return air to flow through the top plates into the plurality of channels of the bottom structure, and when oriented in a second position the openings are not above the plurality of channels for return air flow and prevent return air from flowing through the top plates into the plurality of channels of the bottom structure.

6. The railcar of claim 1, further comprising a return air gutter extending longitudinally between the bottom structure and one of the side walls of the railcar; and wherein:
when the top plates comprise openings that permit return air to flow through the top plates into the plurality of channels of the bottom structure, a width of the top plates extends transversely to obstruct a larger portion of the return air gutter than when the top plates prevent return air from flowing through the top plates into the plurality of channels of the bottom structure.

7. The railcar of claim 1, further comprising a return air gutter extending longitudinally between the bottom structure and one of the side walls of the railcar; and wherein:
when the top plates prevent return air from flowing through the top plates into the plurality of channels of the bottom structure, a width of the top plates extends laterally to obstruct a smaller portion of the return air gutter than when the top plates comprise openings that permit return air to flow through the top plates into the plurality of channels of the bottom structure.

8. The railcar of claim 1, further comprising a return air space extending laterally between the bottom structure and an end of the railcar; and wherein:
when the top plates comprise openings that permit return air to flow through the top plates into the plurality of channels of the bottom structure, a length of the top plates extends longitudinally to obstruct a larger portion of the return air space than when the top plates prevent return air from flowing through the top plates into the plurality of channels of the bottom structure.

9. The railcar of claim 1, further comprising a return air space extending laterally between the bottom structure and an end of the railcar; and wherein:
when the top plates prevent return air from flowing through the top plates into the plurality of channels of the bottom structure, a length of the top plates extends longitudinally to obstruct a smaller portion of the return air space than when the top plates comprise openings that permit return air to flow through the top plates into the plurality of channels of the bottom structure.

10. A floor for a refrigerated container comprising a pair of side walls, a roof, the floor, and a refrigeration unit, the floor comprising:

a bottom structure comprising a plurality of channels for return air flow from an interior of the container to the refrigeration unit; and at least two top plates coupled to the bottom structure, wherein each of the top plates extends longitudinally along the bottom structure and is configured to rotate up and away from the bottom structure proximate one of the side walls of the pair of side walls;

wherein the at least two top plates are pivotally coupled to the bottom structure via one or more pivot rods coupled to a longitudinal edge of the bottom structure proximate one of the side walls of the pair of side walls, wherein lifting an edge of a top plate opposite the edge of the top plate pivotally coupled to the bottom structure causes the top plate to rotate to an upright position exposing the plurality of channels of the bottom structure.

11. The floor of claim 10, wherein the at least two top plates are coupled to the bottom structure via one or more mechanical quick disconnect fasteners.

12. The floor of claim 10, wherein the at least two top plates comprise openings that permit return air to flow through the top plates into the plurality of channels of the bottom structure.

13. The floor of claim 10, wherein the at least two top plates prevent return air from flowing through the top plates into the plurality of channels of the bottom structure.

14. The floor of claim 10, wherein the at least two top plates comprise openings that, when oriented in a first position the openings are above the plurality of channels for return air flow and permit return air to flow through the top plates into the plurality of channels of the bottom structure, and when oriented in a second position the openings are not above the plurality of channels for return air flow and prevent return air from flowing through the top plates into the plurality of channels of the bottom structure.

15. The floor of claim 10, further comprising a return air gutter extending longitudinally between the bottom structure and one of the side walls of the container; and wherein:

when the top plates comprise openings that permit return air to flow through the top plates into the plurality of channels of the bottom structure, a width of the top plates extends transversely to obstruct a larger portion of the return air gutter than when the top plates prevent return air from flowing through the top plates into the plurality of channels of the bottom structure; and when the top plates prevent return air from flowing through the top plates into the plurality of channels of the bottom structure, a width of the top plates extends laterally to obstruct a smaller portion of the return air gutter than when the top plates comprise openings that permit return air to flow through the top plates into the plurality of channels of the bottom structure.

16. The floor of claim 10, further comprising a return air space extending laterally between the bottom structure and an end of the container; and wherein:

when the top plates comprise openings that permit return air to flow through the top plates into the plurality of channels of the bottom structure, a length of the top plates extends longitudinally to obstruct a larger portion of the return air space than when the top plates prevent return air from flowing through the top plates into the plurality of channels of the bottom structure; and when the top plates prevent return air from flowing through the top plates into the plurality of channels of the bottom structure, a length of the top plates extends longitudinally to obstruct a smaller portion of the return air space than when the top plates comprise openings that permit return air to flow through the top plates into the plurality of channels of the bottom structure.

17. A method for use with a refrigerated railcar, the refrigerated railcar comprising a pair of side walls, a roof, a floor, and a refrigeration unit, the floor comprising: a bottom structure comprising a plurality of channels for return air flow from an interior of the railcar to the refrigeration unit, and a top plate pivotally coupled to the bottom structure via a pivot rod, wherein the top plate extends longitudinally along the bottom structure and is pivotally coupled to the bottom structure proximate one of the side walls of the pair of side walls, the method comprising:

disconnecting one or more quick disconnect fasteners coupling the top plate to the bottom structure;

lifting an edge of the top plate opposite the edge of the top plate pivotally coupled to the bottom structure;

engaging the edge of the top plate pivotally coupled to the bottom structure with the pivot rod; and rotating the top plate to an upright position exposing the plurality of channels of the bottom structure.

18. The method of claim 17, further comprising resting the top plate against one of the side walls.

* * * * *